United States Patent
Giorgi et al.

(10) Patent No.: US 10,523,597 B2
(45) Date of Patent: Dec. 31, 2019

(54) DATA CENTER NETWORK NODE

(71) Applicant: Telefonaktiebolaget LM Ericsson (publ), Stockholm (SE)

(72) Inventors: Luca Giorgi, Pisa (IT); Giulio Bottari, Pisa (IT); Antonio D'Errico, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/767,251

(22) PCT Filed: Oct. 16, 2015

(86) PCT No.: PCT/EP2015/074061
§ 371 (c)(1),
(2) Date: Apr. 10, 2018

(87) PCT Pub. No.: WO2017/063720
PCT Pub. Date: Apr. 20, 2017

(65) Prior Publication Data
US 2019/0081910 A1   Mar. 14, 2019

(51) Int. Cl.
*H04L 12/935*   (2013.01)
*H04Q 11/00*   (2006.01)

(52) U.S. Cl.
CPC ......... *H04L 49/30* (2013.01); *H04Q 11/0005* (2013.01); *H04Q 11/0062* (2013.01); *H04Q 2011/005* (2013.01); *H04Q 2011/0064* (2013.01); *H04Q 2011/0088* (2013.01)

(58) Field of Classification Search
CPC ................ H04L 49/30; H04Q 11/0005; H04Q 11/0062; H04Q 2011/005; H04Q 2011/0064; H04Q 2011/0088
See application file for complete search history.

(56) References Cited

U.S. PATENT DOCUMENTS

| | | | |
|---|---|---|---|
| 9,860,616 B1* | 1/2018 | Amarittapark | H04Q 11/0005 |
| 2002/0122228 A1* | 9/2002 | Rappaport | H04L 43/026 |
| | | | 398/98 |
| 2013/0254599 A1* | 9/2013 | Katkar | H04L 43/0811 |
| | | | 714/57 |

(Continued)

OTHER PUBLICATIONS

A Survey on Architectures and Energy Efficiency in Data Center Networks by Ali Hammadi and Lotfi Mhamdi; School of Electronic and Electrical Engineering, University of Leeds—May 20, 2013.
(Continued)

*Primary Examiner* — Stephen J Clawson
(74) *Attorney, Agent, or Firm* — Sage Patent Group

(57) ABSTRACT

A data center network node (13) comprising a first data connection (22) for connecting at least one server to a conventional subnetwork comprising at least one of a switch or a router, an optical transceiver (14) comprising a transmitter (16) and a receiver (17), a second data connection (23) for connecting the at least one server to the optical transceiver, a switching arrangement (21) for linking the optical transceiver (14) to an offload subnetwork (10), the switching arrangement configurable between a first configuration (24) in which the offload subnetwork bypasses the optical transceiver and a second configuration (28) in which the optical transceiver is optically linked to the offload subnetwork.

16 Claims, 19 Drawing Sheets

(56) References Cited

U.S. PATENT DOCUMENTS

2015/0312659 A1* 10/2015 Mehrvar ............ H04Q 11/0005
398/45
2017/0099532 A1* 4/2017 Kakande ............ H04Q 11/0066

OTHER PUBLICATIONS

OSA: An Optical Switching Architecture for Data Center Networks With Unprecedented Flexibility by Kai Chen et al., Northwestern University, UIUC, NEC Labs America, San Jose, USA—2012.
Fast Path Acceleration for Open vSWITCH in Overlay Networks by Salaheddine Hamadi et al.; Universite du Quebec A Montreal—IEEE 2014.
C-Through: Part-Time Optics in Data Centers by Guohui Wang et al.—2010.
International Search Report for International application No. PCT/EP2015/074061—dated Aug. 22, 2016.
SDN-Enabled All-Optical Circuit Switching: An Answer to Data Center Bandwidth Challenges, White Paper, www.polatis.com—2015.

* cited by examiner

US 10,523,597 B2

DATA CENTER NETWORK NODE

PRIORITY

This nonprovisional application is a U.S. National Stage Filing under 35 U.S.C. § 371 of International Patent Application Serial No. PCT/EP2015/074061 filed Oct. 16, 2015 and entitled "DATA CENTER NETWORK NODE."

TECHNICAL FIELD

The disclosure relates to a data center network node, a data center network, and a method of operating a node in a data center network or a data center network.

BACKGROUND

Data centers or large clusters of servers have become increasingly employed in universities, enterprises and consumer settings to run a variety of applications such as web services, instant messaging, gaming, data analysis, scientific computing and many others. Data centers typically comprise many thousands of servers arranged hierarchically, typically with racks containing 10-40 servers each, linked by a Data Center Network (DCN).

FIG. 1 is a schematic diagram of a traditional data center network. This shows a hierarchical architecture in which the bulk of the traffic is between the servers and the outside network, so-called "north-south" traffic. The data center (1) comprises a link to external networks (2), servers (6) and a switching hierarchy (7) comprising core routers (3), access routers (4) and switches (5).

With the advent of cloud computing, the data patterns in such networks have changed. In particular, traffic flows between workloads are no longer contained in a single physical server. As a consequence, each server handles multiple workloads. Thus, there is a continuous need to exchange data among servers inside a data center. Instead of the predominance "north-south" traffic, the bulk of the traffic is now "east-west", between servers. This change has resulted in an evolution in the design of the topology and operation of data centers.

Instead of the hierarchical architecture, data center networks have evolved towards a "flat" topology. FIG. 2 is a schematic diagram of such a "flat network", comprising a cross point switch (8), to improve interconnectivity between servers (6).

Although very much more suitable for cloud computing applications and their characteristic data flows, the flat architecture is not entirely satisfactory. The problem lies in large data flows, known as "elephant flows", which typically originate from server back-up or virtual machine migration. Elephant flows are comparatively rare, but when they are present, they can dominate a data center network at the expense of smaller so-called "mice flows". This can have a highly detrimental effect on the quality of service of mice flows, which are typically delay sensitive. "Mice" flows may be characterized as being latency sensitive short-lived flows, typical of active interaction among machines and real time processing. "Elephant" flows may be characterized as bandwidth intensive flows, for which throughput is more important than latency. Elephant flows may further be considered as having a relatively large size, e.g. larger than a threshold. Elephant flows tend to fill network buffers end-to-end and to introduce big delays to the latency-sensitive mice flows which share the same buffers. The result is a performance degradation of the internal network.

One solution to this problem is the use of "packet offload", wherein a separate network is provided for elephant flows. The idea of optimizing infrastructure through offloading is not new. For example, in legacy networks, big bulks of Synchronous Digital Hierarchy (SDH) circuits were "offloaded" on DWDM point-to-point trunks.

FIG. 3 is a schematic diagram of an optical offload network for a data center network according to the prior art. In addition to the usual electrical switching arrangements (3,5), there is an optical network (10). Each rack of servers has a top of rack (ToR) switch (9), each of which is connected to the optical network (10). The optical network comprises an optical cross-connect (11) in the form of a Micro-electrical mechanical switch (MEMS). Although effective in providing an optical offload, such a network is complex to implement.

SUMMARY

Accordingly, in a first aspect of the present disclosure, there is provided a data center network node comprising a first data connection for connecting at least one server to a first subnetwork comprising at least one of a switch or a router. The node further comprises a switching arrangement configured to link an optical transceiver of the node to an offload subnetwork. The switching arrangement is configurable between a first configuration in which the offload subnetwork bypasses the optical transceiver and a second configuration in which the optical transceiver is optically linked to the offload subnetwork.

This arrangement has the advantage of providing an effective optical offload to provide for elephant flows.

In a second aspect of the present disclosure, there is provided a data center network comprising at least three nodes comprising an optical switching arrangement; and a first subnetwork configured to connect the nodes, comprising at least one of a switch and a router; wherein the nodes comprise a first data connection for connecting at least one server to the first subnetwork. The network further comprises an offload subnetwork comprising an optical link configured to provide an optical path arranged to link the optical switching arrangements of the nodes. The node further comprises an optical transceiver for connecting to the at least one server and for transmitting and receiving on the optical link. The switching arrangement is configurable between a first configuration in which the optical path bypasses the optical transceiver and a second configuration in which the optical path is optically connected to the optical transceiver, such that the offload subnetwork is configurable to provide a point-to-point link between two of the nodes whilst bypassing the optical transceiver of the at least one other node.

In a third aspect of the present disclosure, there is provided a method of operating a node in a data center network. The node comprises a first data connection for connecting at least one server to a first subnetwork comprising at least one of a switch or a router. The method comprises receiving a control signal for a switching arrangement of the node, and configuring the switching arrangement to a first configuration in which an offload subnetwork bypasses an optical transceiver of the node or to a second configuration in which the optical transceiver is optically linked to the offload subnetwork.

In a fourth aspect of the present disclosure, there is provided a method of operating a data center network, the network comprising a first subnetwork, an offload subnetwork and at least three nodes. The first subnetwork is configured to connect the nodes and comprises at least one of a switch and a router; and the offload subnetwork comprises an optical path to link the nodes, the method comprising identifying a flow between a first node and a second node for offloading to the offload subnetwork; and establishing a point-to-point link between the first node and the second node by configuring switching arrangements of the first node and the second node to connect a transceiver of the node to the optical path. The method further comprises configuring the switching arrangement of the at least one other node to bypass the optical path from the transceiver of the node.

In a fifth aspect of the present disclosure, there is provided an orchestrator for a data center network comprising a determining unit for detecting or determining a flow for communication over a optical offload subnetwork by comparing a characteristic of the flow with a threshold; and a scheduling unit for constructing a schedule of logical links for transmission of flows between network nodes in the offload subnetwork. The orchestrator is further configured to transmit control signals to network nodes connected by the offload subnetwork to configure a switching arrangement at the network nodes to either connect or bypass the offload subnetwork.

In a sixth aspect of the present disclosure, there is provided a method of operating an orchestrator, comprising detecting or determining a flow for communication over an optical offload subnetwork by comparing a characteristic of the flow with the threshold; and constructing a schedule of logical links for transmission of flows between network nodes in the offload subnetwork. The method further comprises transmitting control signals to network nodes connected by the offload subnetwork to configure a switching arrangement at the network nodes to either connect or bypass the offload subnetwork.

In a seventh aspect of the present disclosure, there is provided a computer program, comprising instructions which, when executed on at least one processor, cause the at least one processor to carry out a method according to any example In an eighth aspect of the present disclosure, there is provided a computer program product comprising a computer program according to any example.

BRIEF DESCRIPTION OF THE DRAWINGS

The above and other aspects of the present disclosure will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
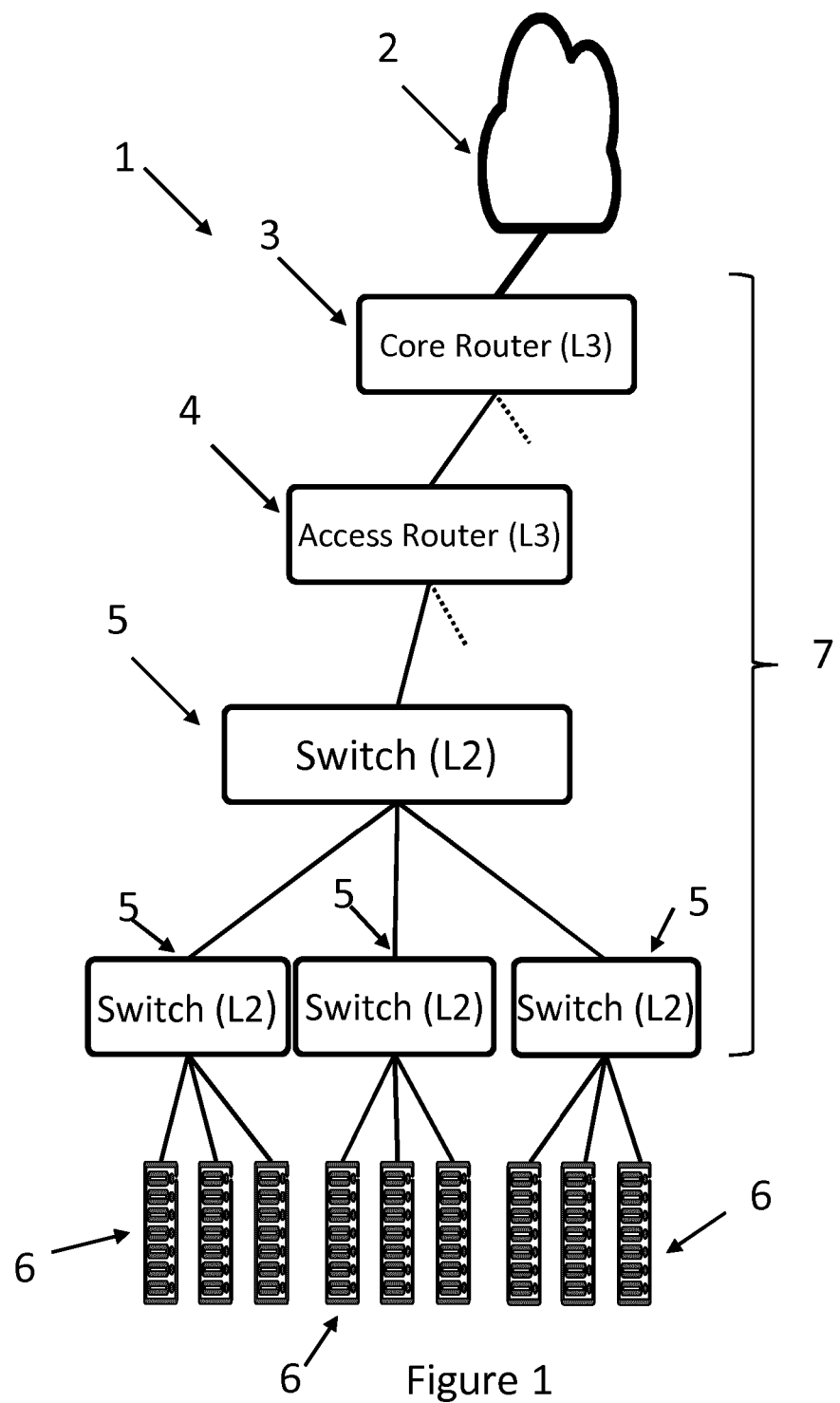
FIG. 1 is a schematic diagram of a traditional hierarchical data center network according to the prior art.
Figure 2:
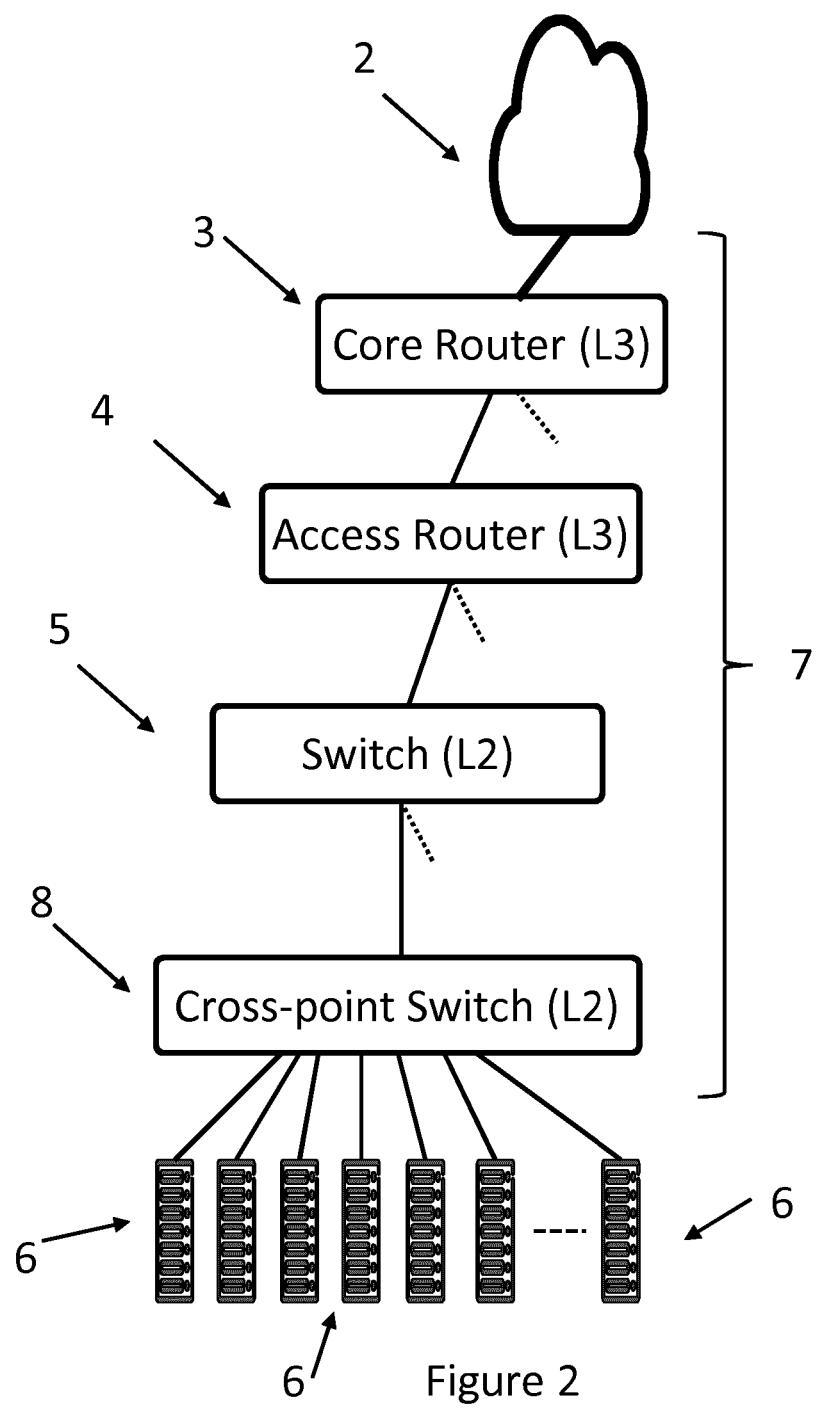
FIG. 2 is a schematic diagram of a flat data center network according to the prior art.
Figure 3:
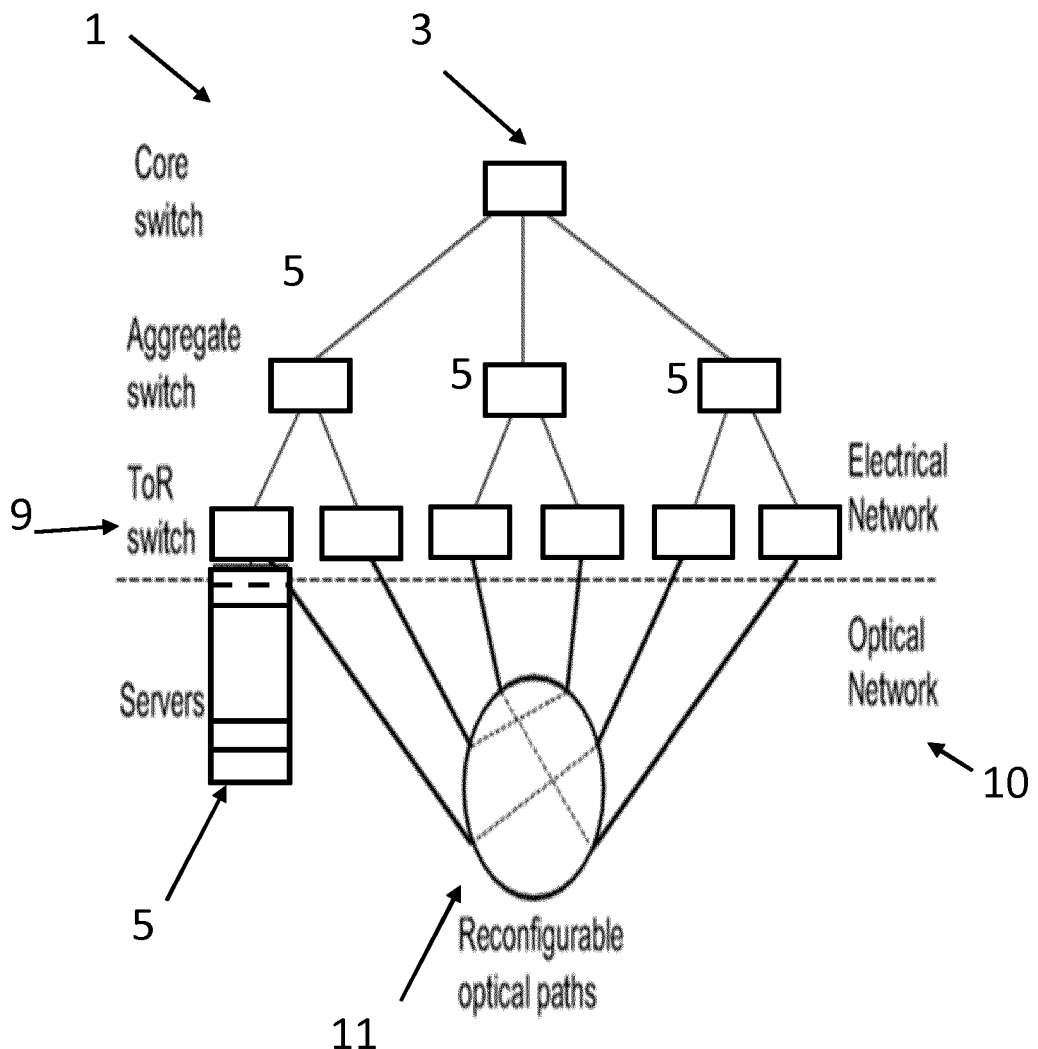
FIG. 3 is a schematic diagram of a data center network with an optical offload provided by means of an optical cross connect according to the prior art.
Figure 4:
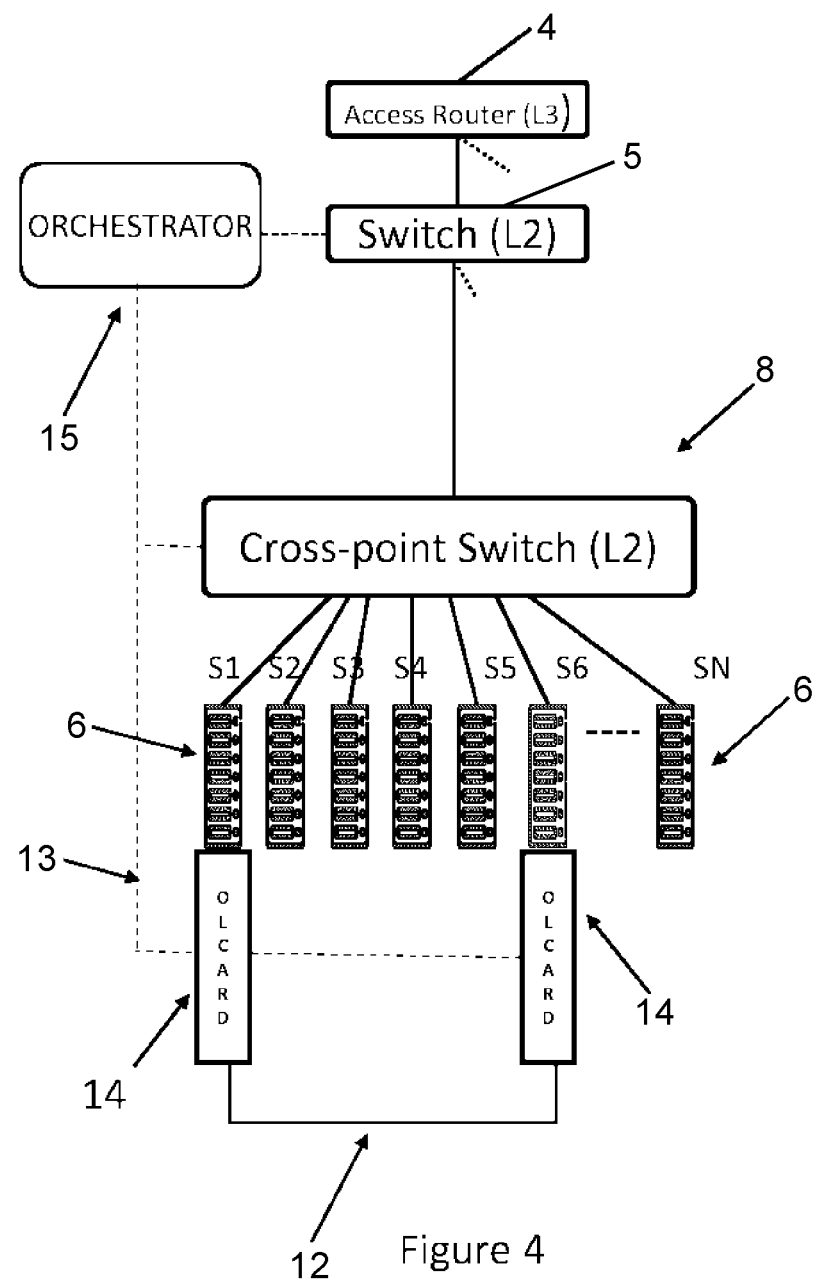
FIG. 4 is a schematic diagram of a simple optical connection between racks in a network with a plurality of racks unconnected by an optical offload network.

FIG. 4 is a schematic diagram of such an arrangement, showing a plurality of nodes (13), each configured to provide connectivity for one or more servers (6). The node comprises a connection to a first subnetwork, comprising for a packet switched communication between the nodes using switch (8). In some aspects, the first subnetwork may further comprise switch (5) and/or router (4). In an example, each of the nodes (13) comprises optical line cards (14), which are connected with an optical fiber link (12). An orchestrator (15) controls the optical line cards. Aspects of the disclosure provide for a connection of two nodes are connected using an optical offload to provide a simple point to point optical link between two nodes. The simplest way to connect two nodes using an optical offload is to provide a simple point to point optical link between two nodes.

In the functional arrangement shown in FIG. 4, the configuration of a point to point link allows a considerable simplification of the network. Data can be transmitted via the optical layer with much of the higher layer protocol overhead omitted, resulting in a significant saving of bandwidth for large data flows between two nodes. Aspect of the disclosure provide for switching arrangements which enable configuration of such point-to-point links between nodes. The switching arrangements at each node avoid requiring providing physical optical point-to-point links between every pair of nodes in a network, or providing a single optical cross-connect providing connectivity for all nodes. An aim of the present disclosure is to simplify and reduce the costs of implementing an offload optical network. In an embodiment this is achieved by emulating the point to point links such as shown in FIG. 4, and also allowing a degree of dynamic configurability. The recognition that the comparative rareness of elephant flows and the relative delay insensitivity of this type of flow mean that it is only necessary to have a single point to point link at a given time in the offload. This allows a simplified and cheaper offload network.

In an embodiment, there is provided a data center network with a first subnetwork and an offload subnetwork. The first subnetwork comprises a conventional type of switched network used in a data center network, with either a hierarchical or flat arrangement of switches (5,8) and/or routers (4). The offload subnetwork may be defined as comprising an optical path and a plurality of optical switches. The data center network comprises a plurality of nodes, each comprising an optical switching arrangement for connecting to the offload subnetwork. The node is configured to enable connection of servers with either the first subnetwork and/or the offload subnetwork.

Figure 5:
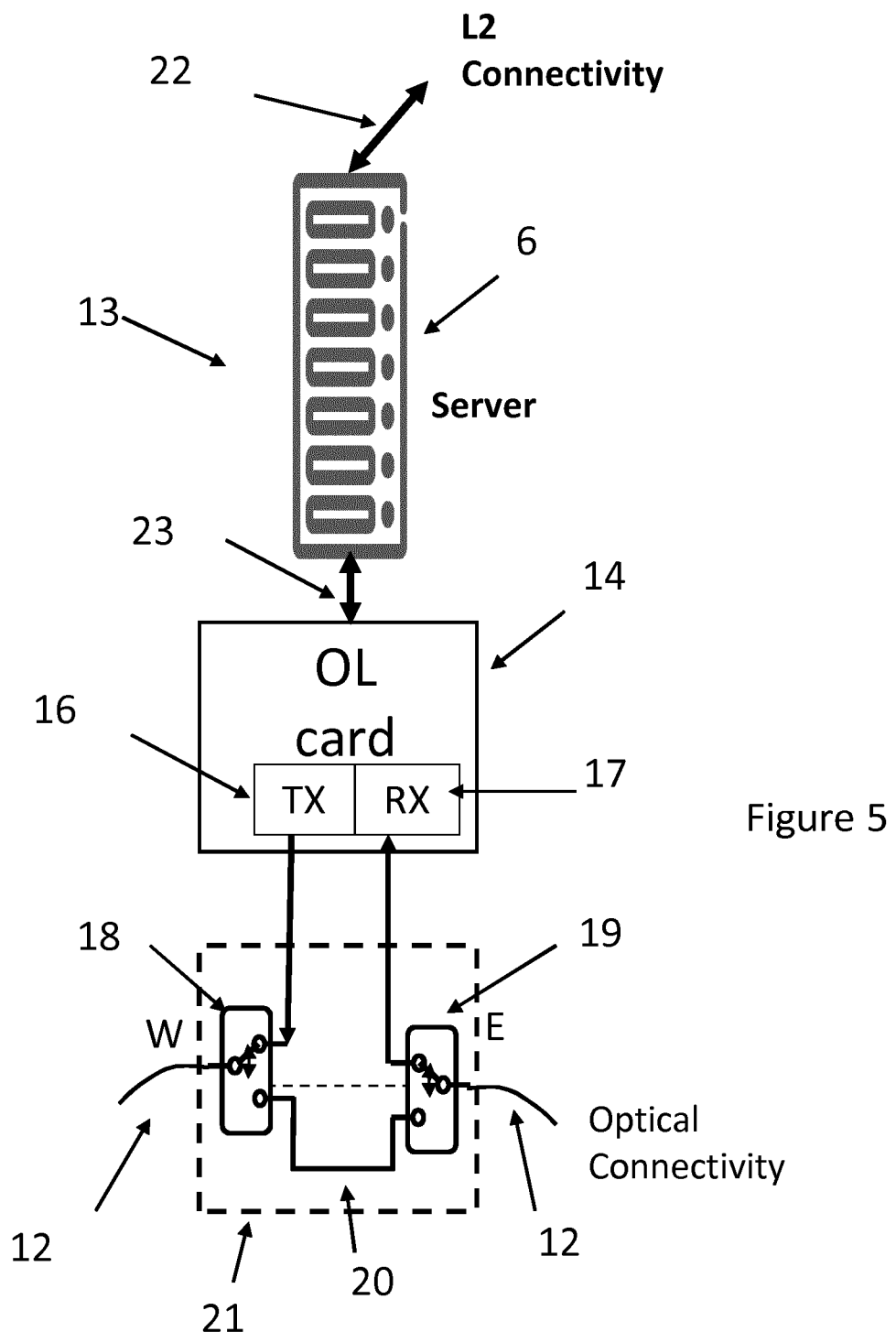
FIG. 5 is a schematic diagram of a node comprising an optical line card and switching arrangement according to an embodiment.

FIG. 5 is a schematic diagram of a node according to an embodiment. Each server rack (6) has two data connections, the first data connection (22) to a first subnetwork comprising an electrical switching arrangement and the second data connection (23) to the optical line card (14). The optical line card provides for connection to an offload subnetwork. The optical line card (14) comprises an optical transmitter (16) and an optical receiver (17). The optical transmitter (16) and the optical receiver (17) may together be considered as an optical transceiver. The optical transmitter (16) and optical receiver (17) are optically connected to an optical switching arrangement (21). The optical switching arrangement (21) comprises a first optical switch (18) and a second optical switch (19). The optical transmitter (16) is coupled to the first optical switch (18) and the optical receiver (17) is optically connected to the optical receiver (17). This arrangement allows the connection of the transmitter and receiver to an optical link (12).

The switching arrangement (21) further comprises an optical bypass link (20). The optical bypass link (20) provides an optical connection between the first optical switch (18) and a second optical switch (19). The optical bypass link (20) provides a direct connection between the first optical switch (18) and a second optical switch (19). The optical bypass link (20) provides for an optical signal carried by the optical link (12) to bypass the optical line card (14). Thus, the optical bypass link (20) provides for the optical transceiver to be bypassed by the offload subnetwork.

The switching arrangement (21) is configured to switch optical traffic from or to the optical link (12) between either the optical line card (14) or the optical bypass link (20). Only two servers at a time can communicate each other over the offload subnetwork, if enabled by the orchestrator.

Figure 6:
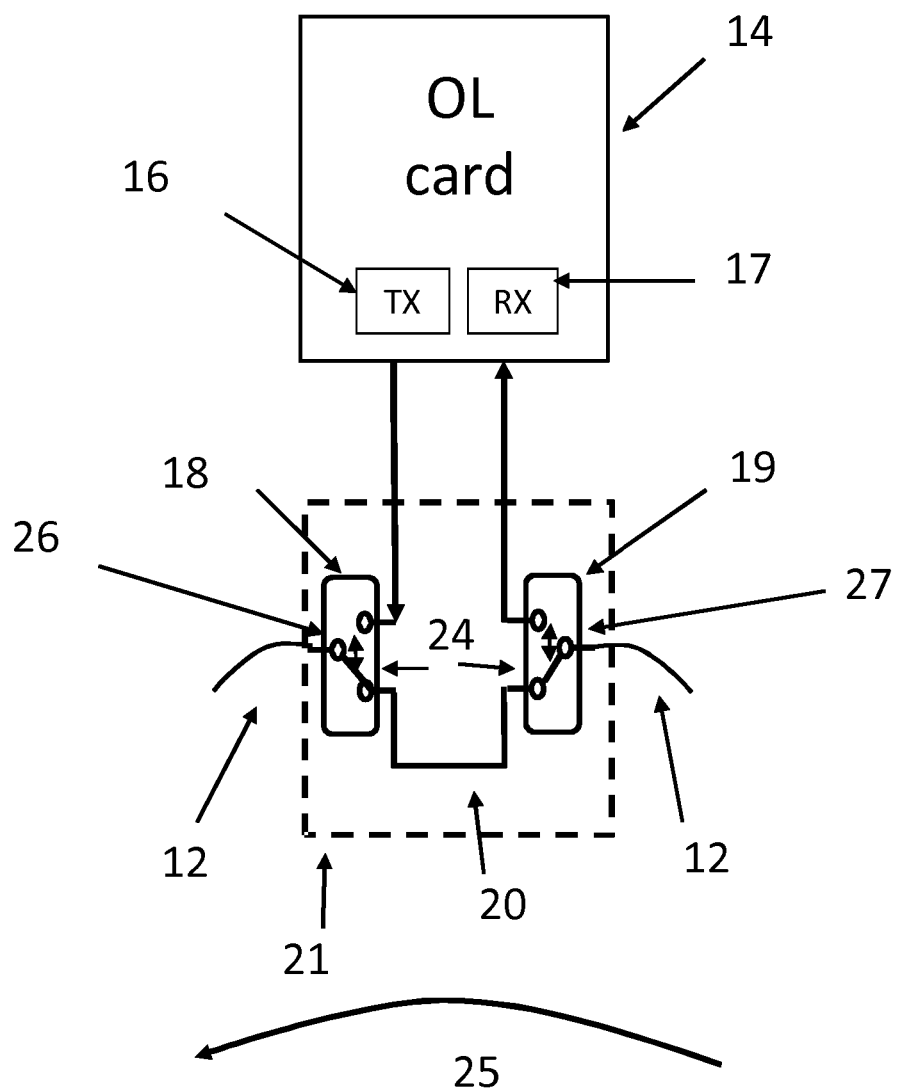
FIG. 6 is a schematic diagram of an optical line card and switching arrangement according to an embodiment with the switches in a configuration in which the offload network bypasses the optical transceiver of the node.
Figure 7:
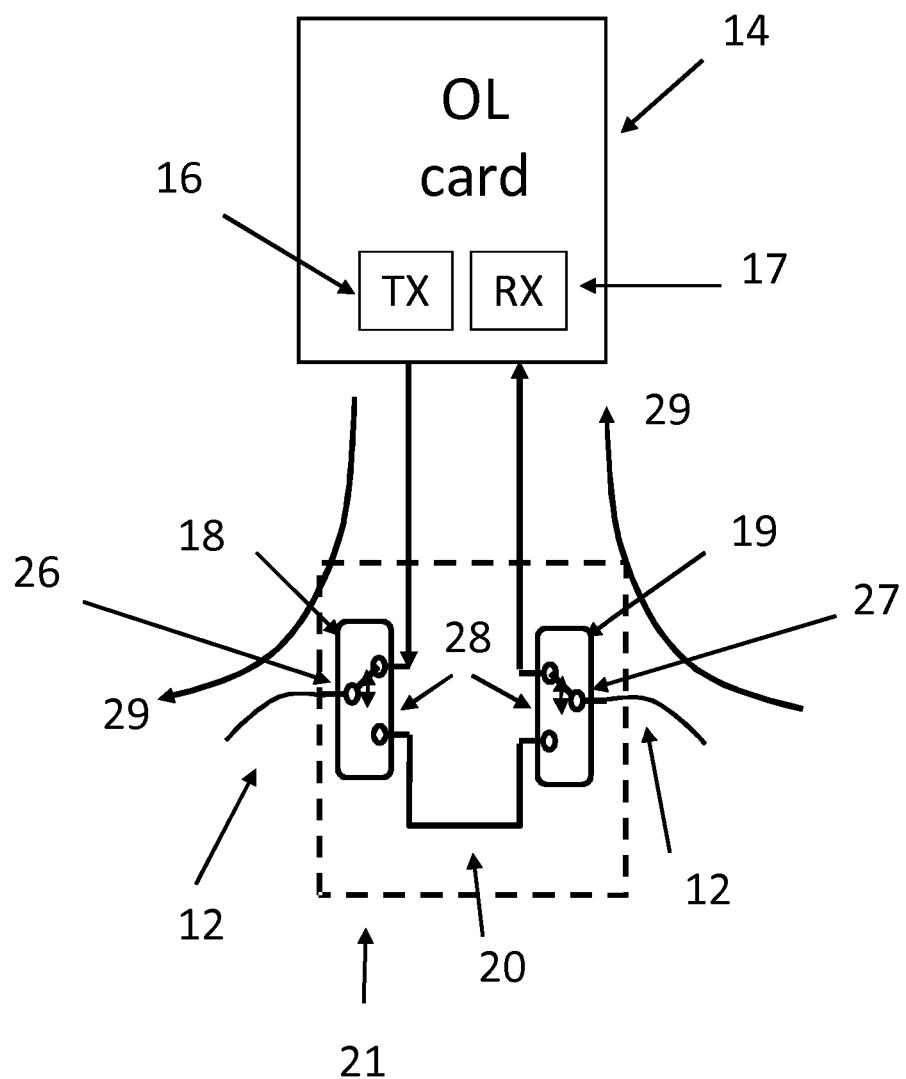
FIG. 7 is a schematic diagram of an optical line card and switching arrangement according to an embodiment with the switches in a configuration connecting the optical transceiver of the node to the offload network.

FIGS. 6 and 7 are schematic diagrams which show how the described optical line card (14) provide a selection to either link the optical transceiver (16,17) of a node to the offload subnetwork, or, provide for the offload subnetwork to bypass the optical transceiver.

FIG. 6 shows the switching arrangement (21) in a first configuration (24), in which the optical transceiver (i.e. optical line card) is bypassed by the offload subnetwork. At the first optical switch (18), a first external port (26) is connected to a first end of the optical bypass link (20) and at the second optical switch, a second external port (27) is connected to a second end of the optical bypass link (20). The overall result is that the data path (25) bypasses the optical transceiver. The optical switches (18), (19) may use any suitable technology to provide a selective optical connection between the nodes.

FIG. 7 shows the switching arrangement in a second configuration (28), in which the optical transceiver is connected to the offload subnetwork. At the first optical switch (18), the first external port (26) is connected to the transmitter (16) and at the second optical switch (19), the second external port (27) is connected to the receiver (17). The overall result is that the data path (29) goes through the optical transceiver. The examples shown illustrate optical communication in one direction around the ring. Alternatively, the transceiver and/or switching arrangement may be configured to communication in the opposite direction, bi-directionally on the same optical link (fiber), or bi-directionally using a plurality of optical links (fibers).

Figure 8:
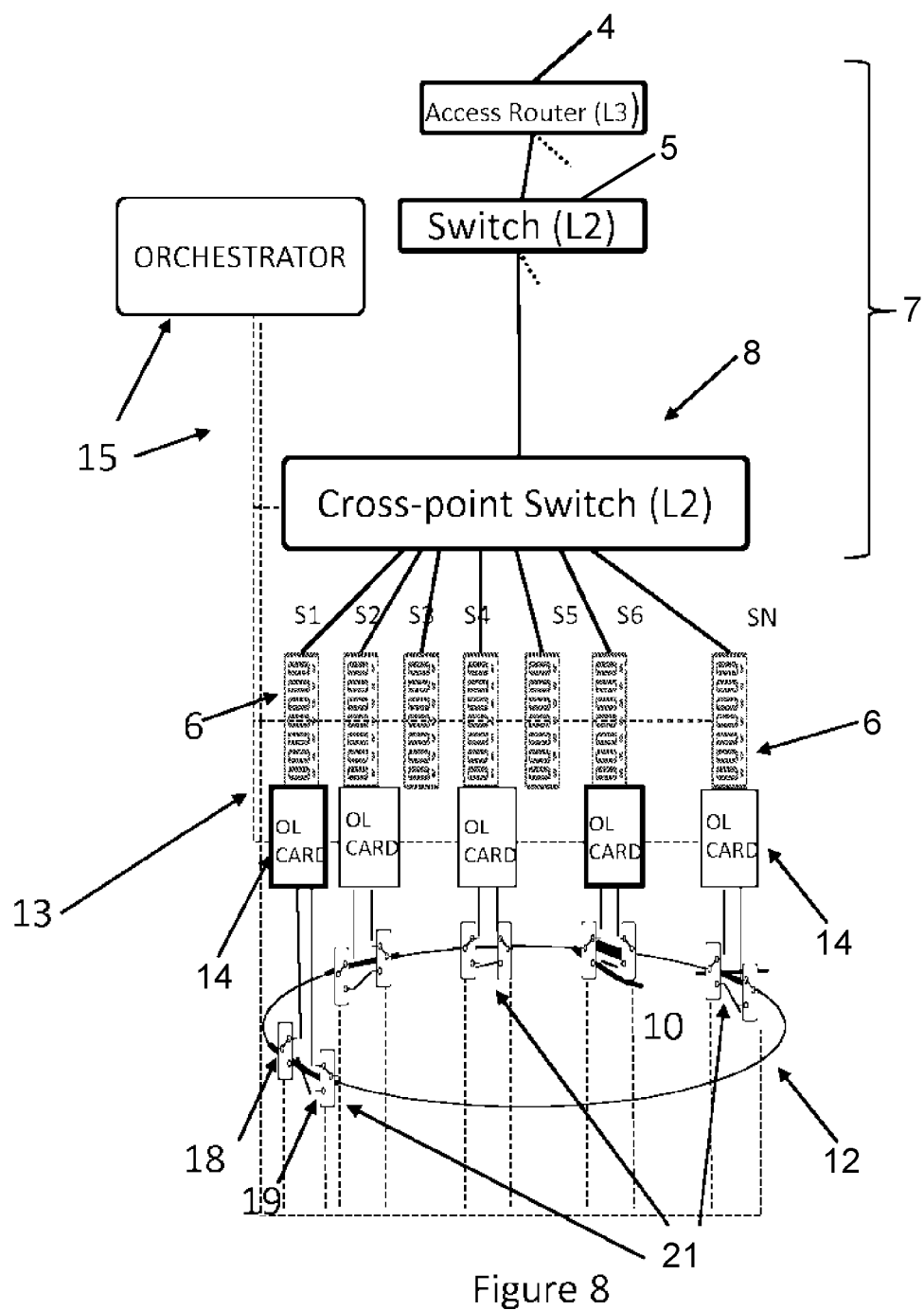
FIG. 8 is a schematic diagram of a network comprising a plurality of nodes, each equipped with an optical line card and switching arrangement according to an embodiment.

FIG. 8 is a schematic diagram of a data center network comprising a plurality of nodes having the optical line card (14) and the switching arrangement (21) according to the embodiment of FIG. 5. A plurality of server nodes (13) are served by a packet switch (8), a e.g. cross point switch and an offload network or subnetwork (10).

In the embodiment of FIG. 8, the offload subnetwork comprises an optical ring. Alternatively, the offload subnetwork may have a different topology, such as an optical bus or optical star network. The disclosure is not limited to a particular topology. Each node (13) which is part of the offload subnetwork is connected by the optical link, e.g. the optical ring. The offload subnetwork allows an optical connection to be set up between any two of the nodes (13). The switching arrangement described provides for the two connected nodes to effectively be in a point-to-point connection, with the further nodes bypassed by their respective switching arrangements (21). Thus, the offload subnetwork does not have a single switch which determines the connection between nodes (13). This contrasts with the cross-point switch (8) shown. Instead, the offload subnetwork comprises separate switching arrangements (21) at each of the connected nodes (13). This provides for an effective switching to establish point-to-point connections for large (i.e. elephant) flows.

Figure 9:
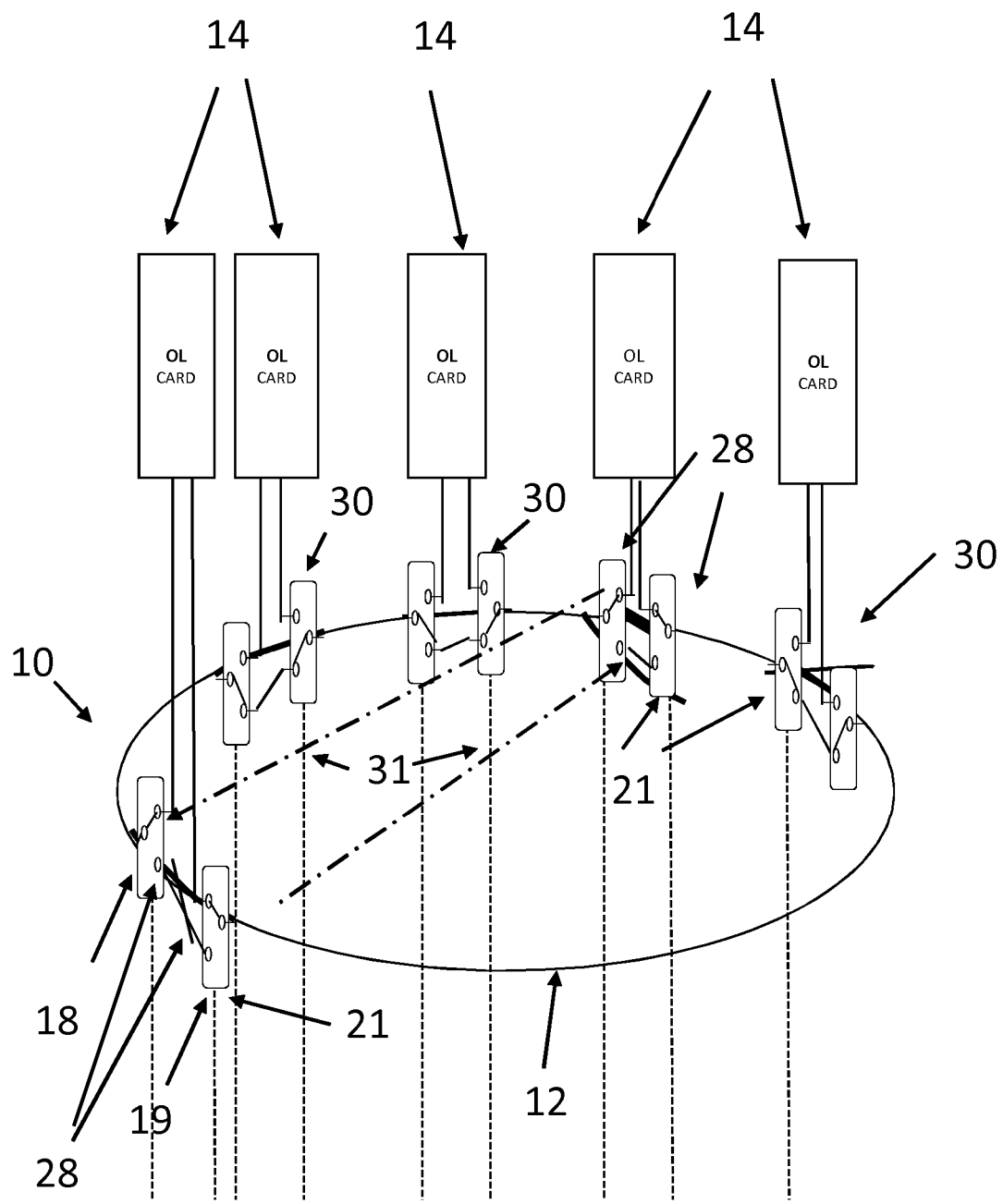
FIG. 9 is a schematic diagram of the network of FIG. 9 configured to provide a point to point link between two of the nodes.

FIG. 9 is a schematic diagram of the arrangement according to the embodiment of FIG. 8, showing the establishment of a point-to-point link between two of the nodes. The point-to-point link is established by the switching arrangements of the connected nodes being set in the second configuration (28). This forms a point-to-point logical link (31) between the respective nodes. The point-to-point connection may be considered as having end points which can be dynamically changed. The optical point-to-point connection provides an optical layer connection between the two selected nodes, instead of requiring switching of packets at Layer 2 or Layer 3.

The other nodes (30) have their switching arrangements in the first configuration, in which the optical transceivers of the other nodes (30) are bypassed by the offload subnetwork (10). In this manner, a logical topology is created which is equivalent to the physical topology of FIG. 5. This allows the simplification of the network protocols. The offload network allows the establishment of a temporary single link for the duration of an elephant flow. The logical bidirectional connections (31) are shown, and the physical connection uses the optical link.

Figure 10:
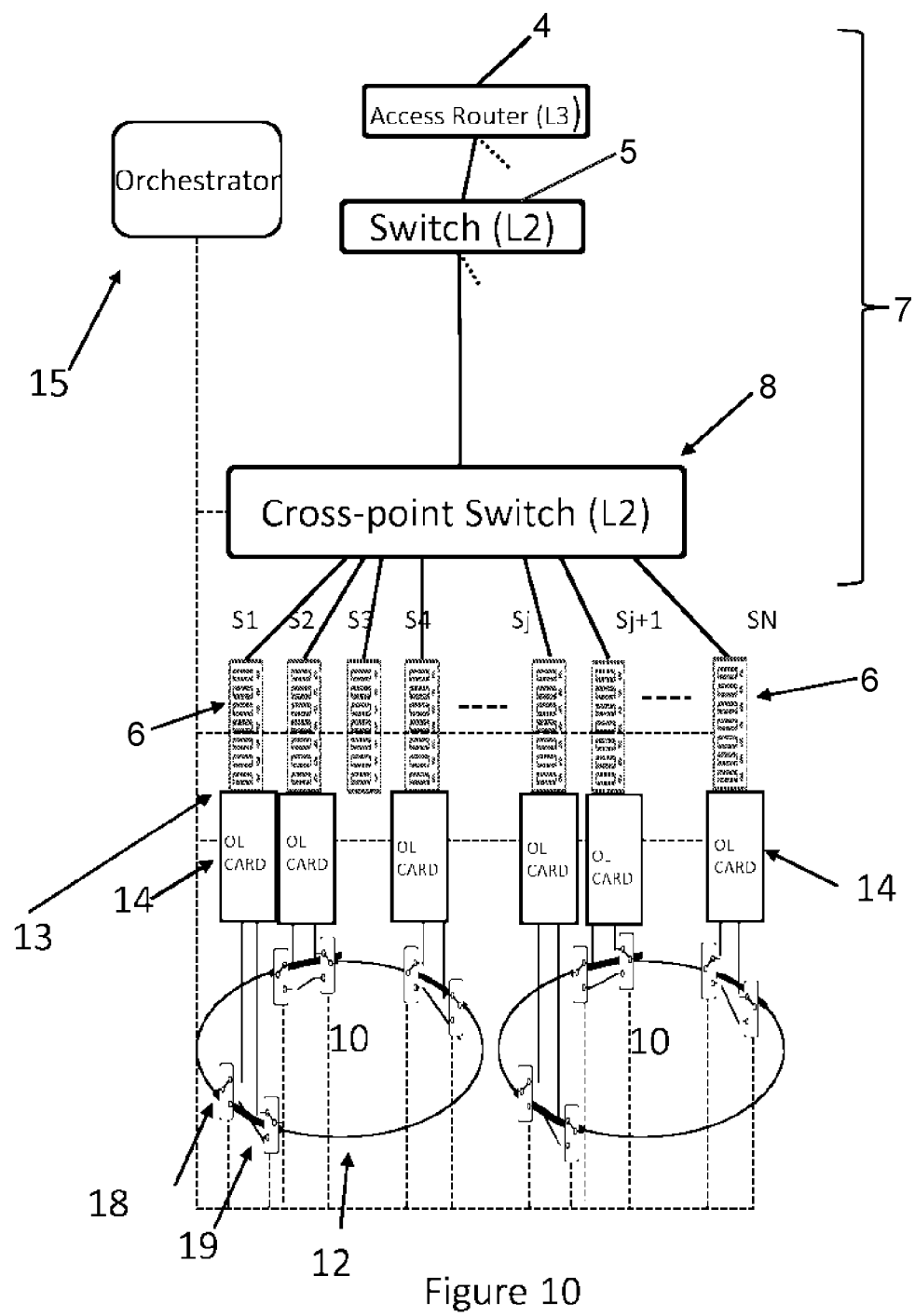
FIG. 10 is a schematic diagram of a data center network comprising two offload networks according to an embodiment.

FIG. 10 is a schematic diagram of a further example of a data center network comprising a plurality of offload subnetworks (10). The offload subnetworks (10) link a different groups of server nodes (13). The groups of nodes (13) served by a particular offload subnetwork (10) may be separate as shown, or one or more node may be in more than one group, i.e. connected to a plurality of offload subnetworks (10). The plurality of offload subnetworks (10) may have different configurations, size and/or topology.

The number of nodes (13) served by a single offload subnetwork may be determined according to the characteristic traffic flows between servers in the data center. The disclosure is not limited to any one arrangement of offload subnetworks. In the arrangement of FIG. 10, both of the offload subnetworks are controlled by a single orchestrator (15). Alternatively, separate orchestrators for separate offload subnetworks may be used. The disclosure is not limited to any one arrangement of orchestrators.

The network node comprises the switching arrangement for linking the optical transceiver to the offload subnetwork. As described, the switching arrangement configurable between a first configuration in which the offload subnetwork bypasses the optical transceiver and a second configuration in which the optical transceiver is optically linked to the offload subnetwork.

The network node may be defined as comprising a first data connection for connecting at least one server to a first (conventional) subnetwork comprising at least one of a switch or a router. In a further example, the node is defined based only on the connection to the offload network.

Optionally, the network node is defined as comprising the optical transceiver, i.e. comprising the transmitter and the receiver. Alternatively, the switching arrangement may be considered as comprising an optical port, configured to provide for optical communication between the switching arrangement and the optical transceiver.

Optionally, the network node is defined as further comprising a second data connection for connecting at least one server to the optical transceiver. In some examples, the node may be considered as including the at least one server. In other examples, the node may be considered as a node configured to provide connectivity to the at least one server, i.e. at least through the offload subnetwork, and does not include the server itself.

Figure 11:
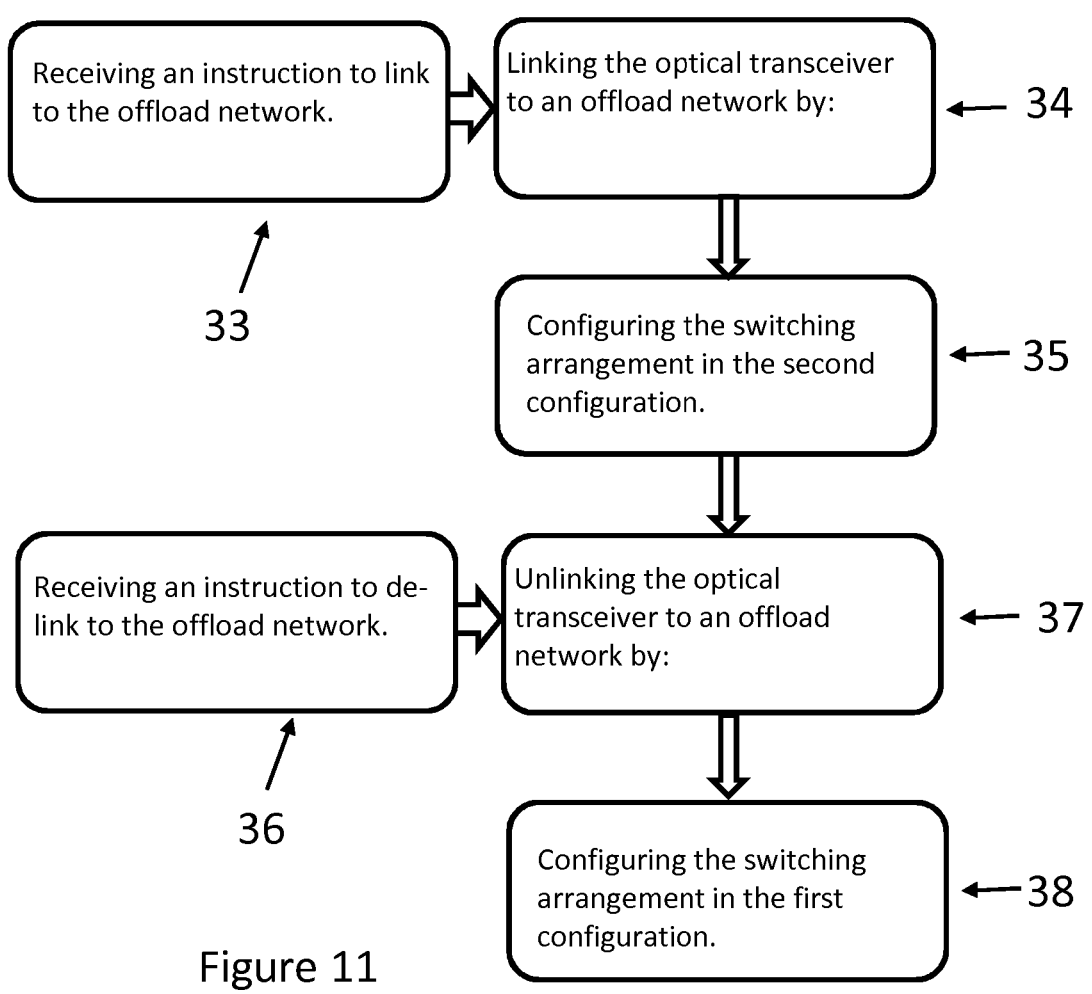
FIG. 11 is a flow chart of a method of operating a data center network node according to an embodiment.

FIG. 11 is a flow chart illustrating a method by which a network node may be operated according to an embodiment. The method (32) shows example steps of use in a data center network (32). In 33, a node receives an instruction or command to link or connect to the offload subnetwork. For example, the instruction is from the orchestrator or other controller. In 34, the linking (34) the optical transceiver to the offload subnetwork is carried out by the step of configuring (35) the switching arrangement to be in the second configuration. Data may then be transmitted on the optical link to and/or from the transceiver.

The method (32) shows further example steps, which may be considered as following or separate from the above steps 33 to 35. In 36, the node receives an instruction or command to de-link from the offload subnetwork. In 37, the de-linking the optical transceiver from the offload network is carried out by the step of configuring (38) the switching arrangement to the first configuration. In this configuration, data may not be transmitted or received by the node using the offload subnetwork, although communication via the first data connection and switch/router (8) is still available. In an embodiment, the method uses a node wherein the switching arrangement comprises a first optical switch, a second optical switch; and an optical bypass link. The first optical switch is connected to a first external port and is reconfigurable between the first configuration in which the first external port is connected to a first end of the optical bypass link and the second configuration in which the first external port is connected to the transmitter. The second optical switch is connected to a second external port and is reconfigurable between the first configuration in which the second external port is connected to a first end of the optical bypass link and the second configuration in which the second external port is connected to the receiver. In an embodiment, the instructions to link or delink are received from an orchestrator.

Figure 12:
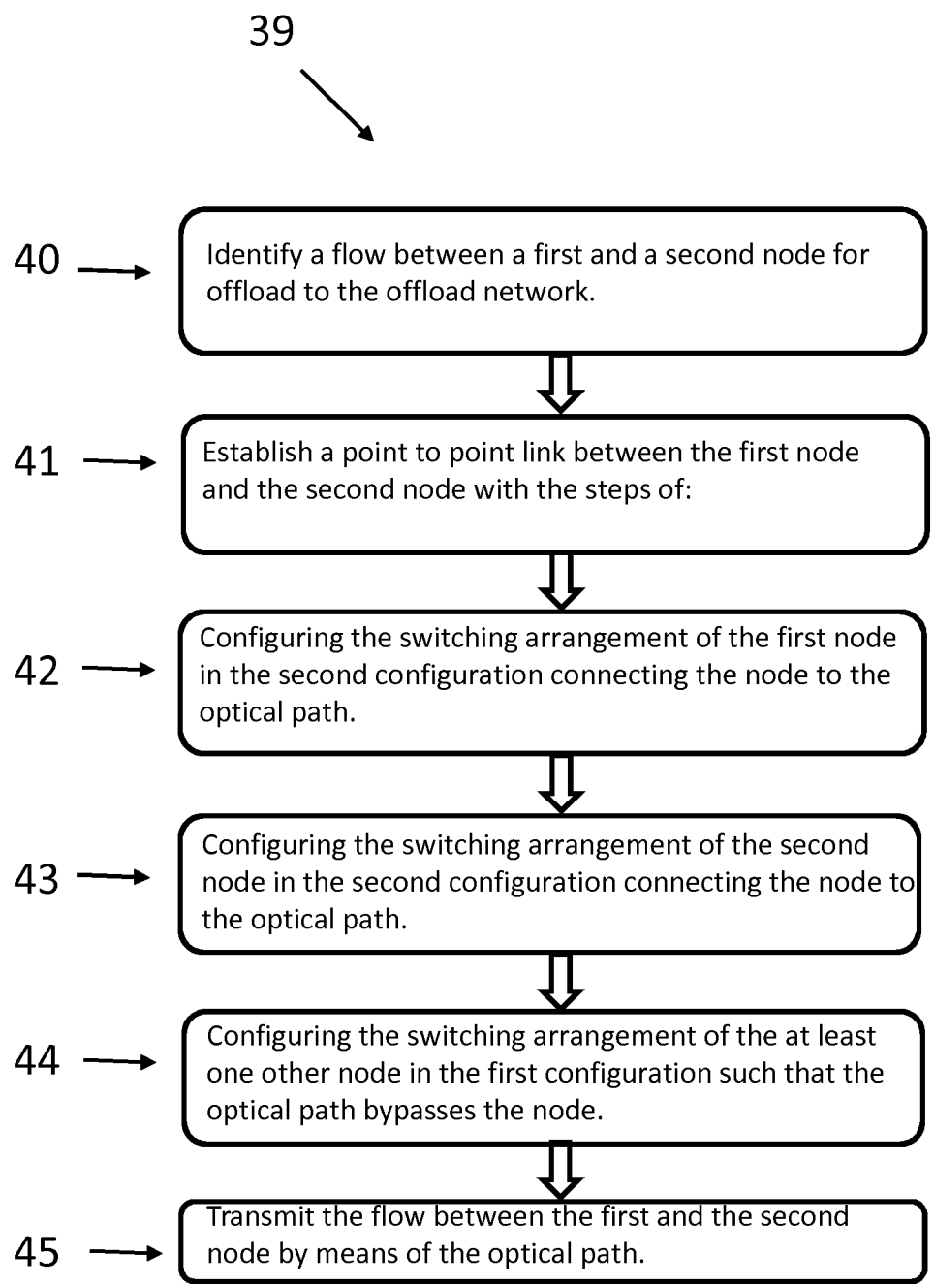
FIG. 12 is a flow chart of a method of operating a data center network according to an embodiment.

FIG. 12 is a flow chart illustrating the steps of a method 39 of operating a data center network according to an embodiment. The data center network comprises a first (conventional) subnetwork, an offload subnetwork and at least three nodes. The offload subnetwork comprises an optical path, each node connectable to the optical path comprises a switching arrangement configurable between a first configuration in which the optical path bypasses the optical transceiver and a second configuration in which the optical path is optically connected to the optical transceiver. In some examples, the node may be considered as comprising an optical transceiver or a port to connect to an optical transceiver.

The method comprises steps for controlling the offload network, e.g. by an orchestrator or controller. In (40), the method identifies a flow between a first node and a second node for offload to the offload subnetwork (40). In (41), the method establishes a point-to-point link between the first network node and the second network node. The point-to-point optical link is configured by the step (42) of configuring the switching arrangement of the first network node to be in the second configuration, i.e. connecting the transceiver to the optical link. The configuring may be by transmitting a control signal to the node, e.g. to the switching arrangement or to a node controller configured to control the switching arrangement. In 43, the method configures the switching arrangement of the second network node to be in the second configuration, i.e. connecting the transceiver to the optical link. The configuring may be by transmitting a control signal to the node, e.g. to the switching arrangement or to a node controller configured to control the switching arrangement.

In 44, the method configures the switching arrangement of the at least one other network node which is not involved in the point-to-point link to be in the first configuration, i.e. with the switching arrangement providing a bypass link and not connecting the optical link to the transceiver. The configuring in 44 may comprise transmitting a control signal to the switching arrangement or a node controller of the other nodes. Alternatively, the orchestrator or controller may not transmit a signal if the switching apparatus is determined to already be in the first configuration or will automatically default to the first configuration.

In 45, the method controls transmission of the flow on the point-to-point link. The orchestrator or controller may control the flow directly, or may send a control signal (e.g. to at least one of the nodes) to initiate transmission.

In an embodiment, the method is performed in a network wherein the switching arrangement of at least one of the nodes comprises a first optical switch, a second optical switch and an optical bypass link. The first optical switch is connected to a first external port and is reconfigurable between the first configuration in which the first external port is connected to a first end of the optical bypass link and the second configuration in which the first external port is connected to the transmitter. The second optical switch is connected to a second external port and is reconfigurable between the first configuration in which the second external port is connected to a first end of the optical bypass link and the second configuration in which the second external port is connected to the receiver. In order to configure the offload subnetwork, the one or more orchestrator needs to identify which flows are to be offloaded onto the optical offload subnetwork. The flows handled by the offload network are relatively large flows, i.e. an elephant flow. Smaller flows are handled by the first data connection and switch (8). A determination that a particular flow is an elephant flow may be made by the orchestrator or another data center controller.

The definition of an elephant flow may be based on one or more criteria. For example, a flow may be determined to be an elephant flow if it is determined to require, or uses, a high bandwidth. For example, the flow is determined to be an elephant flow if it has a characteristic, e.g. required bandwidth or size which is determined to be more than a threshold. For example, the flow is determined to be an elephant flow if it is (or will be) using more than a predetermined threshold of the network or link capacity, e.g. during a given measurement interval. A flow is a set of packets that match the same properties, such as source/destination ports (e.g. TCP ports). For the purpose of this disclosure, an elephant flow, also referred to as a high bandwidth flow, is any flow which has a characteristic, which when compared to a threshold, is determined to be best carried on the offload network. For example, the high bandwidth flow may be identified if requiring more than a given threshold of network capacity, e.g. based on the capacity of the first subnetwork (i.e. using the switch (8)).

In an embodiment, high bandwidth flows which may be offloaded onto the offload subnetwork are identified by using a threshold related to network capacity. Typically this threshold relates to available bandwidth. Flows which have a bandwidth requirement above the threshold are designated as high bandwidth flows and the capacity demands associated with them are referred to as high bandwidth flow demands. The threshold may be set by the operator or set in a default. The threshold may be set such that the offload network, which can only be configured for one point-to-point connection, is not overwhelmed by a large number of demands. The threshold may also be set such that the first subnetwork is not required to handle the highest bandwidth or largest flows. The disclosure is not limited to any one level of threshold, means of setting or storing the threshold or network parameter to which it relates. The determination to use the offload subnetwork for the flow may be based one or more criteria, e.g. bandwidth requirements, size, length, availability of the offload subnetwork. The values of the flow for the one or more criteria may be compared to thresholds to determine if the flow should be carried by the offload subnetwork.

In an embodiment, the data center network orchestrator is configured to schedule traffic flows between nodes on the offload subnetwork in response to high bandwidth flow demands, defined as a flow requiring a proportion of network capacity (e.g. in a measurement period) which is greater than a threshold. The network capacity may be the capacity of the first subnetwork.

Once high bandwidth flow demands have been identified, a schedule of logical links between the nodes of the network is constructed so as to enable the high bandwidth flows to be transmitted on the offload network. In an embodiment the schedule of logical links comprises a list of pairs of nodes to be linked, the order in which they are to be linked and the duration of the logical links. In an embodiment, this schedule is based on an indication of the amount of data estimated for each flow and the nodes between which the flow is required to be transmitted. The time required for the flow may not be known a priori as this depends on the bit rate of the connection. In some cases, the traffic demand can have additional constraints, such as maximum latency, time limit for transmission etc. In an embodiment, this schedule is constructed based on the bandwidth requirements of each of the high bandwidth flow demands. In an embodiment, the delay sensitivity of the flows is considered when scheduling the order and duration of the logical links. The scheduling of the order and duration of the logical links may be based on the delay variation sensitivity of the flows. The orchestrator or other controller may generate such an appropriate schedule to be implemented and the disclosure is not limited to any one scheduling method.

Figure 13:
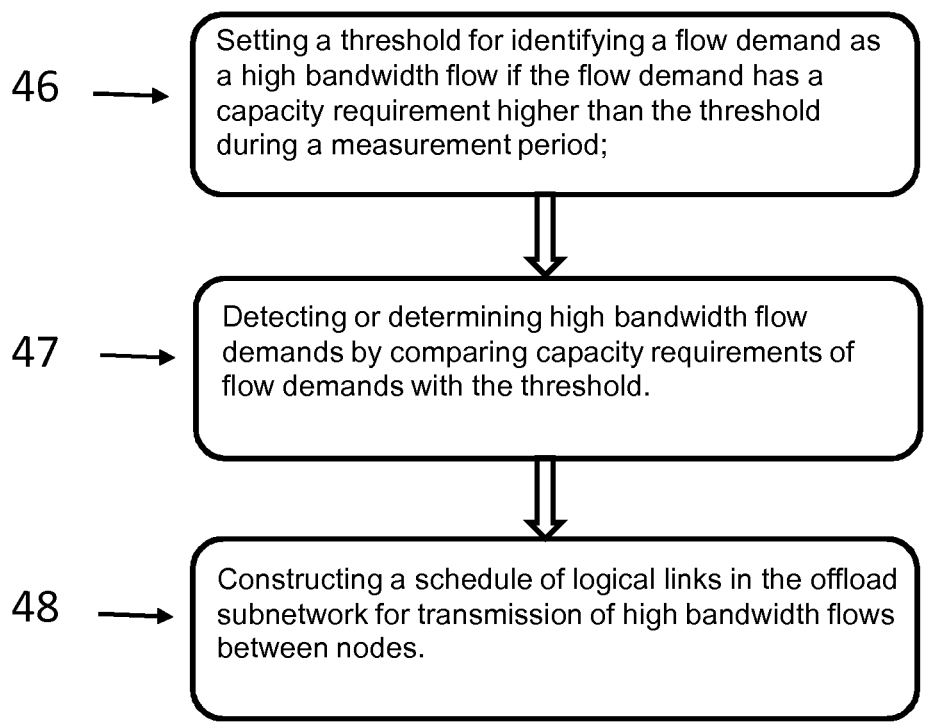
FIG. 13 is a flow chart illustrating a method of constructing a schedule of logical links according to an embodiment.

FIG. 13 is a flow chart illustrating a method of constructing a schedule of logical links according to an embodiment. In an embodiment this takes place at an orchestrator. In (46) a threshold is set or read from a storage for identifying a flow demand as a high bandwidth flow, e.g. if the flow demand has a capacity requirement higher than the threshold during a measurement period. In an embodiment this capacity requirement is a bandwidth requirement. In 47, the method determines or detects high bandwidth flows by comparing their capacity demands with the threshold. In 48, a schedule of logical links is then constructed for transmission in the offload subnetwork of high bandwidth flows between nodes. The method may comprising transmitting a control signal to configure the switching arrangements in the nodes.

When a server is not involved in the offloading function the optical transceiver is maintained in an idle mode in order to save energy. Transitions between the normal operating mode and the idle mode (and vice versa) waste time and hence network capacity, especially in case of high bit rate transmission. As a consequence, number of transitions should be minimized. In an embodiment, the orchestrator will attempt to organize the booking list for the offload subnetwork so as to minimize such transitions.

There are also different techniques which may be used to detect or determine high bandwidth flows. In an embodiment, the orchestrator may poll servers to determine their data requirements. In an embodiment, high bandwidth flows may be detected at the cross point switches. In an embodiment, planned data flows, such as backup or virtual machine migration may be used. In an embodiment, combinations of these techniques may be used. The person skilled in the art will appreciate that there are many options for determining or detecting high bandwidth flows and the disclosure is not limited to any one method.

The presence of an optical offload may not guarantee that all high bandwidth flows are enabled to use the offload. However, the first (conventional) subnetwork is available and the inability to offload does not mean that data is lost. The option of using the first subnetwork means that, in an embodiment, this can be incorporated into the offload scheduling.

Figure 14:
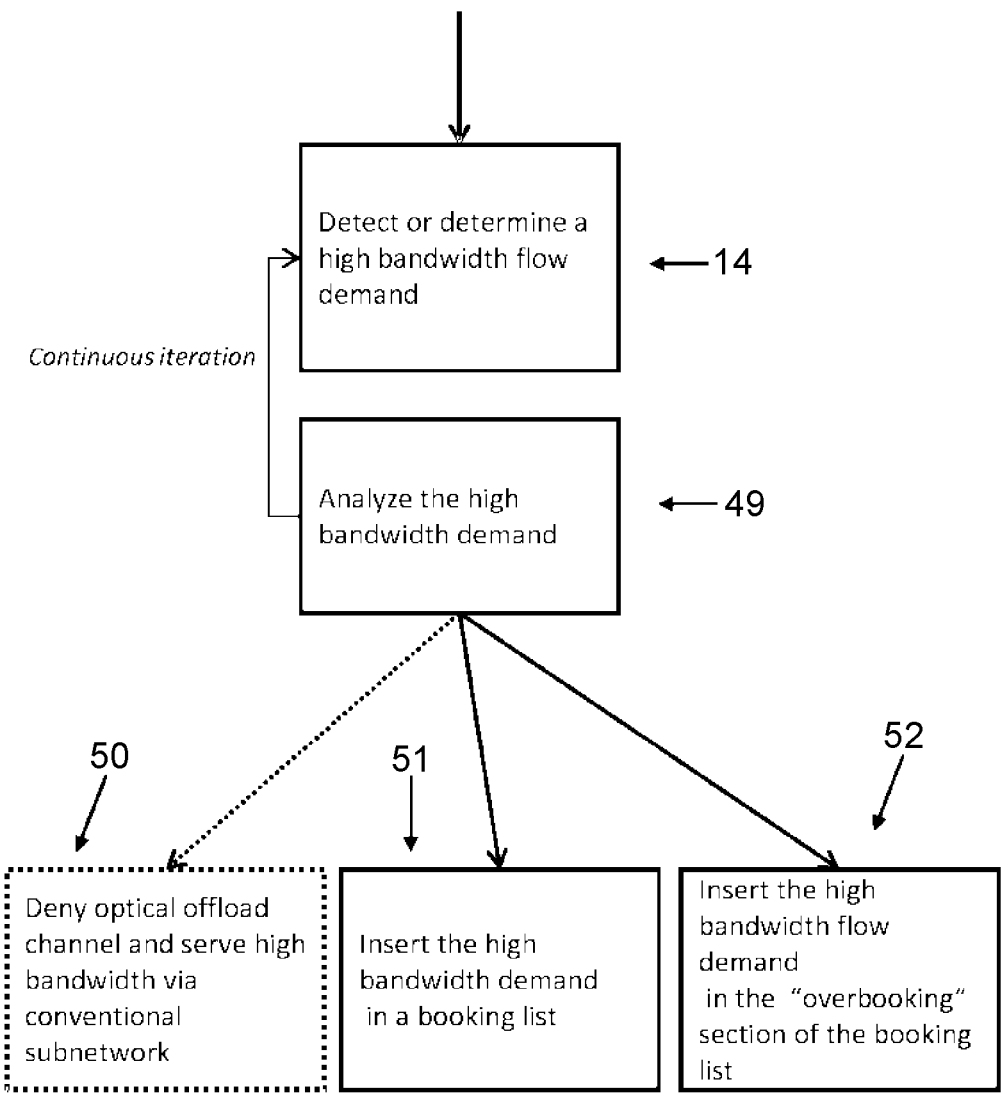
FIG. 14 is a flow chart illustrating a method of constructing a schedule of logical links according to an embodiment.
Figure 15:
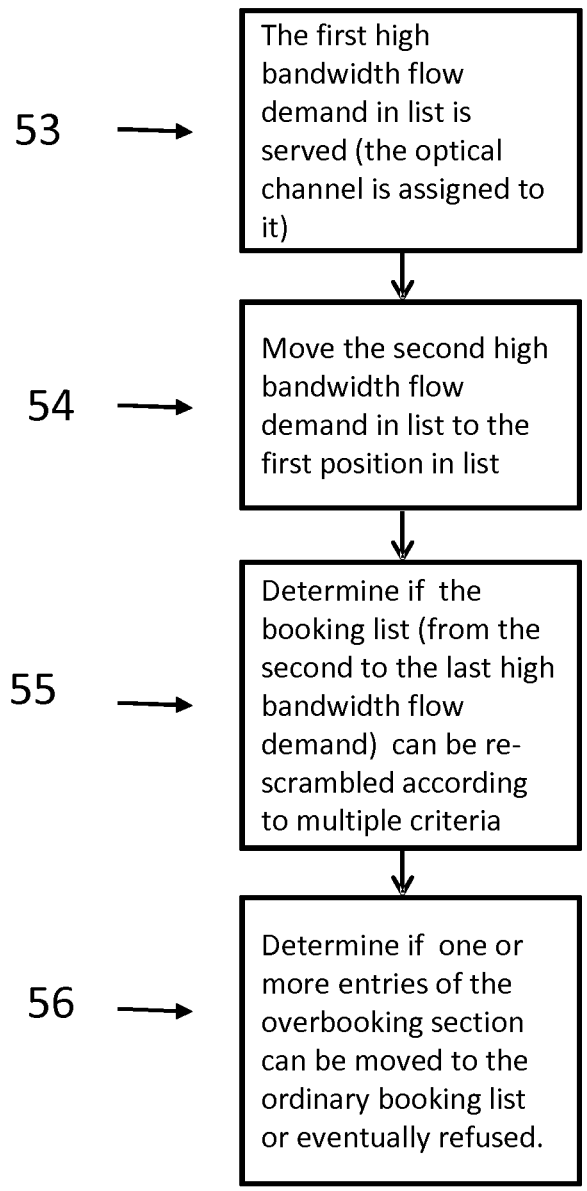
FIG. 15 is a flow chart illustrating a method of constructing a schedule of logical links according to an embodiment.
Figure 16:
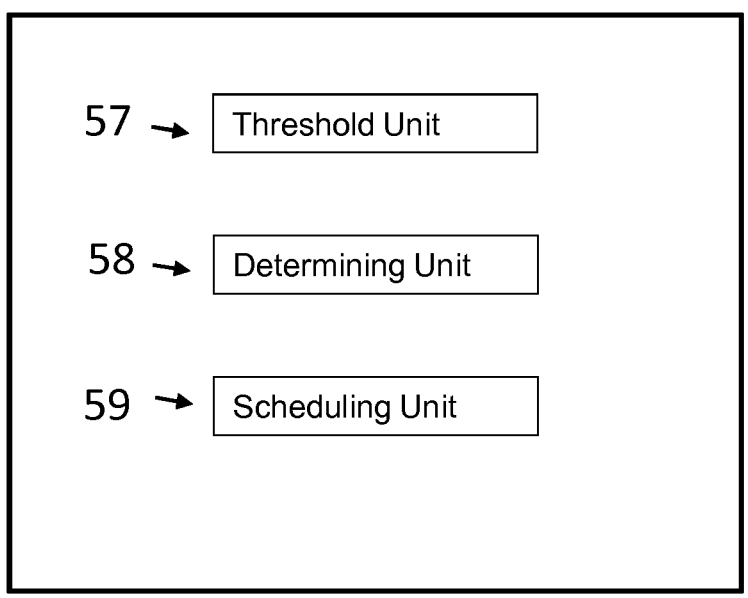
FIG. 16 is a diagram of the units of an orchestrator according to an embodiment.

FIG. 14 is a flow chart showing the steps of such a scheduling method according to an embodiment. In (47), a high bandwidth flow demand is detected or determined. In (49), the high bandwidth flow is then analyzed. This analysis can comprise determining total data flow requirements, latency, time limits etc. Once this analysis has taken place, in an embodiment, the orchestrator has three options. These options are to determine not to use the offload subnetwork (50), to insert the high bandwidth flow demand into a booking list (51) for construction of the schedule of logical links, or to accept the high bandwidth flow demand into an "overbooking" section of the booking list (52). The person skilled in the art will appreciate that all combinations of these options may be used and the disclosure is not limited to any one combination of options. Once the schedule has been constructed, the high bandwidth flow transmissions are implemented. FIG. 15 is a flow chart of an implementation of a schedule according to an embodiment. In (53), the first high bandwidth flow demand in the list is served. Once this is complete, the second high bandwidth flow in the list is moved (54) into first place. In an embodiment, the booking list may be analyzed to determine if the booking list can be re-scrambled (55). This may result in the reordering of flows, e.g. according to latency requirements. It may also result in one or more entries in the overbooking list (56) being put either into the main list or refused and transmitted via the conventional subnetwork. The person skilled in the art will appreciate that there are other options for implementing schedules and the disclosure is not limited to any one method. FIG. 16 is a schematic diagram of logical units of an orchestrator (15) according to an embodiment. These units may be implemented in any combination of software, hardware or firmware. The orchestrator comprises a threshold unit (57) for setting or storing a threshold for identifying a flow demand as a high bandwidth flow, e.g. if the flow demand has a capacity requirement higher than the threshold during a measurement period. The orchestrator further comprises a determining unit (58) for detecting or determining high bandwidth flow demands by comparing capacity requirements of flow demands with the threshold. The orchestrator further comprises a scheduling unit (59) for constructing a schedule of logical links for transmission of high bandwidth flows between network nodes in the offload subnetwork. The scheduling unit may further transmit the control signals to configure the switching arrangements in the nodes.

The orchestrator or other offload network controller may be considered as an apparatus comprising a processor and a memory, the memory containing instructions that when executed by the processor cause the processor to carry out any example of the method or function described.

Figure 17:
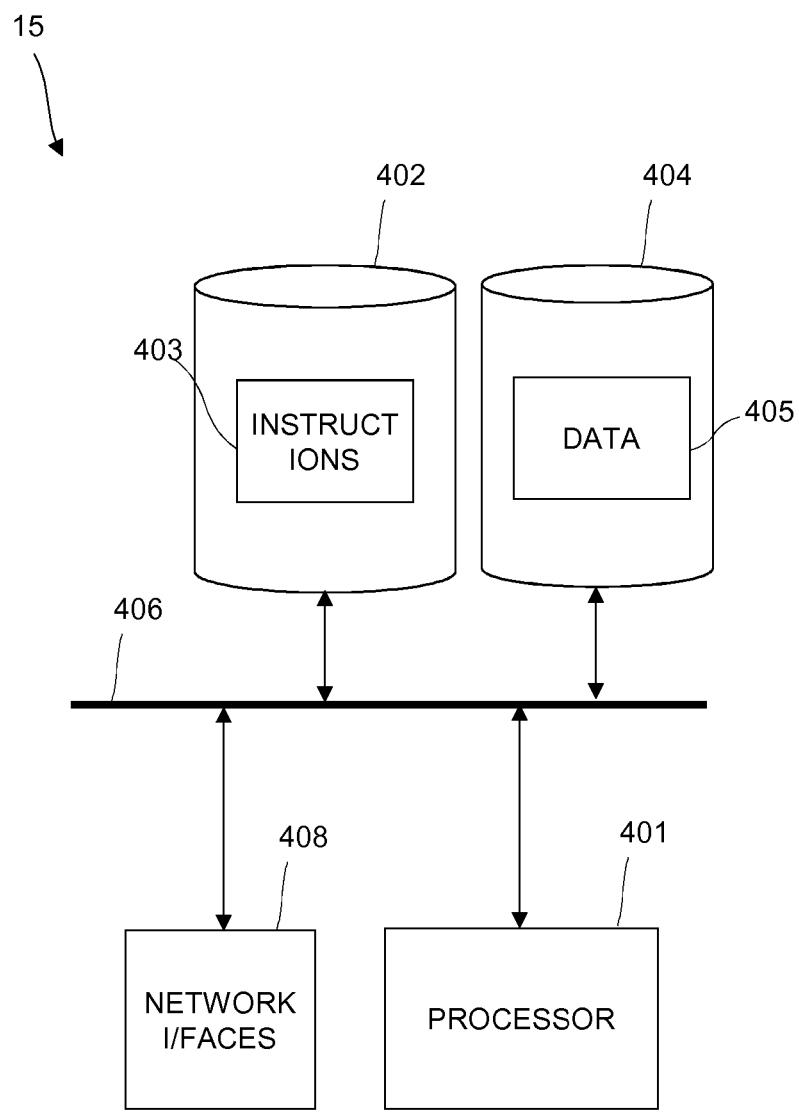
FIG. 17 is a diagram of elements of an orchestrator according to an embodiment.

FIG. 17 shows an example of the orchestrator 15 as a processing apparatus which may be implemented as any form of a computing and/or electronic device, and in which embodiments of the system and methods described above may be implemented. Processing apparatus may implement all, or part of, the method shown or described. The processing apparatus comprises one or more processors 401 which may be microprocessors, controllers or any other suitable type of processors for executing instructions to control the operation of the device. The processor 401 is connected to other components of the node, network or datacenter via one or more buses 406. Processor-executable instructions 403 may be provided using any computer-readable media, such as memory 402. The processor-executable instructions 403 can comprise instructions for implementing the functionality of the described methods. The memory 402 is of any suitable type such as read-only memory (ROM), random access memory (RAM), a storage device of any type such as a magnetic or optical storage device. Additional memory 404 can be provided to store data 405 used by the processor 401. The processing apparatus 400 comprises one or more network interfaces 408 for interfacing with other network entities.

An aspect of the disclosure provides a computer program, comprising instructions which, when executed on at least one processor, cause the at least one processor to carry out a method according to any example. For example, the computer program may be executed by the orchestrator or network node. An aspect of the disclosure provides a computer program product comprising a computer program of any example. An aspect of the disclosure provides a carrier containing the computer program product of any example, wherein the carrier optionally includes an electrical signal, an optical signal, a radio signal, a magnetic tape or disk, an optical disk or a memory stick.

Figure 18:
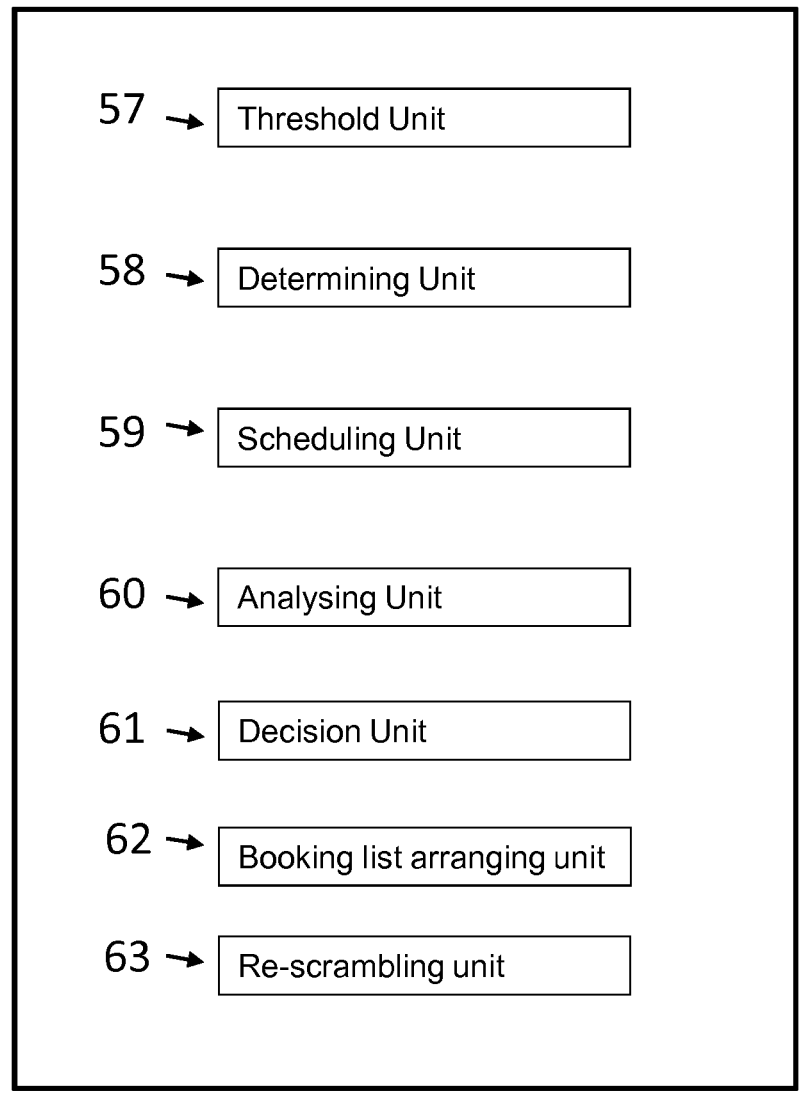
FIG. 18 is a diagram of the units of an orchestrator according to an embodiment.

FIG. 18 is a schematic diagram of logical units for use an orchestrator according to a further embodiment. The orchestrator comprises the units according to the embodiment of FIG. 17 and further comprises an analyzing unit (60) for analyzing each high bandwidth flow demand. The orchestrator (15) may further comprise a decision unit (61) for, on the basis of the analyzing, performing one of three operations: determining not use the offload subnetwork (i.e. denying optical offload), inserting the high bandwidth flow demand into a booking list and inserting the high bandwidth flow demand into an overbooking list.

In a further example, the orchestrator optionally comprises further logical units. For example, the orchestrator (15) comprises a booking list arranging unit (62) for moving a second high bandwidth flow demand in the booking list into a first position. In some examples, the orchestrator optionally comprises a re-scrambling unit (63) for determining if the list may be re-scrambled and determining if one or more entries in the overbooking list may be moved to the booking list or refused.

Figure 19:
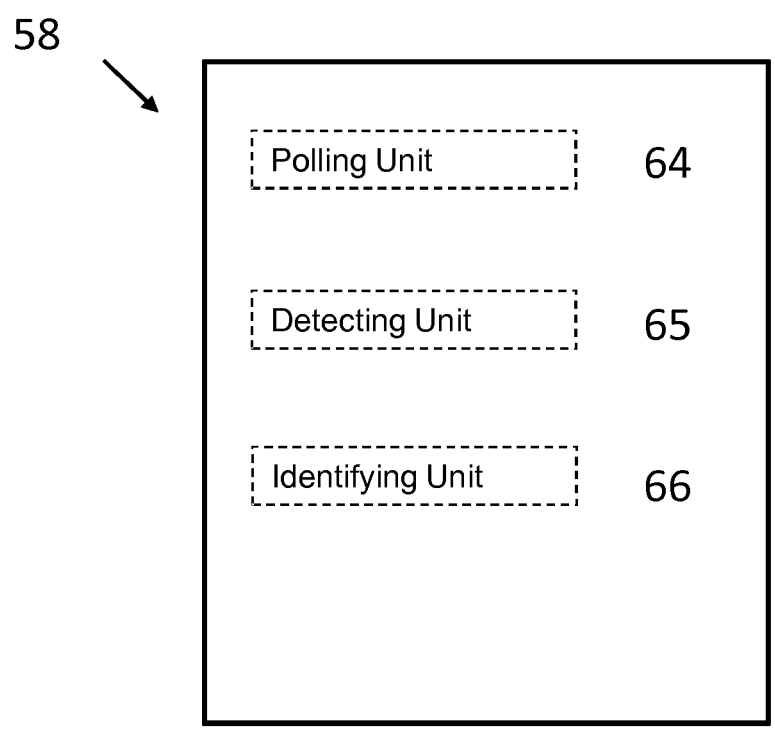
FIG. 19 is a diagram of the units of a determining unit for an orchestrator according to an embodiment.

FIG. 19 is a schematic diagram of the logical units for use in a determining unit (58) of an orchestrator according to an embodiment. In an embodiment, the determining unit (58) comprises a polling unit (64) for periodically polling of network nodes. In another embodiment, the determining unit comprises a detecting unit (65) for detecting high bandwidth flow demands at a cross-point switch. In yet another embodiment the determining unit comprises an identifying unit (66) for identifying high bandwidth flow demands from planned data transfers. The person skilled in the art will appreciate that any combination of the polling unit, the detecting unit and the identifying unit may be used. The disclosure is not limited to any one unit or combination of units.

Aspects of the disclosure are configured to provide connectivity among server machines in a data center. In particular, examples provide for the exchange of time-bounded big data flows between a pair of servers, using a dedicated optical network. The system provides temporary optical connectivity to a pair of servers, enabling the activation of an "off-load" shortcut among them. The usage of said shortcut is assigned and revoked by the orchestrator, for example, by handling a "booking list" for the overall server set.

The orchestrator is configured to detect or determine the need to transfer specific flows between pairs of servers, and administrates the allocation of the offload optical channel according to multiple criteria. For example, the allocation of the offload optical channel may be based on one or more of: deferring offload requests, planning scheduled or periodical transfers, accepting "overbooking" requests, rejecting requests, assigning to the optical channel a temporary role of "backup connection" in case of failure at the L2/L3 switches/router.

Aspects of the disclosure may mitigate the impact of elephant flows on the packet layer, by moving them to a dedicated optical infrastructure (i.e. offload subnetwork). The optical infrastructure is "independent" on the L2/L3 connectivity. Thus, the offload subnetwork is an additional and separate network to the first network (e.g. comprising L2/L3 switches, e.g. switch (8)). Both the first subnetwork and offload subnetwork provide a data connection between servers. The offload subnetwork provides a dynamic offload technique to mitigate the issues of handling elephant flows. A failure at the optical layer (i.e. offload subnetwork) may inhibit the use of the offload subnetwork, but does not affect the communication among servers that can continue at the L2/L3 layer.

In some examples, the offload optical channel (i.e. subnetwork) may act as a backup path in case of failure of the connectivity at L2/L3 (i.e. first subnetwork) between a server and the L2 switch or between a pair of servers. In some examples, the offload optical channel may also facilitate the maintenance or upgrade of the L2 cards on the servers by provisionally providing an alternative connection.

The optical offload subnetwork, being "independent" of the L2/L3 connectivity, may be upgraded (for example towards interfaces at higher bitrate) by temporary disabling the offload mechanism. Aspects of the disclosure provide a simple and cost-effective system. For example, the offload subnetwork is based on an optical transceiver and two optical fiber switches. All the advantages above can be achieved with grey optical technologies.

The term server is used as an example of processing arrangement and/or data storage unit. Examples of the disclosure are applicable to connecting any processing arrangements together which are co-located, e.g. digital units for baseband processing. Aspects are applicable in any environment where different subnetworks are used to connect different processing units, allowing offload of larger/high bandwidth flows to the point-to-point connection of the optical offload subnetwork. Any example described or shown may be used in any combination with any other.

The invention claimed is:

1. A data center network node comprising:
   a first data connection for connecting at least one server to a first subnetwork comprising at least one of a switch or a router; and
   a switching arrangement configured to link an optical transceiver of the node to an offload subnetwork,
   wherein the switching arrangement is configurable between a first configuration in which the offload subnetwork bypasses the optical transceiver and a second configuration in which the optical transceiver is optically linked to the offload subnetwork, wherein the switching arrangement comprises a first optical switch, a second optical switch and an optical bypass link,
   wherein the first optical switch is connected to a first external port and is reconfigurable between the first configuration in which the first external port is connected to a first end of the optical bypass link and the second configuration in which the first external port is connected to the transmitter; and
   wherein the second optical switch is connected to a second external port and is reconfigurable between the first configuration in which the second external port is connected to a second end of the optical bypass link and the second configuration in which the second external port is connected to the receiver.

2. The data center network node as claimed in claim 1 wherein the switching arrangement is configured to provide an optical point-to-point connection between the data center network node and a selected further data center network node.

3. The data center network node as claimed in claim 1, configured to receive a control signal for configuration for the switching arrangement from an orchestrator.

4. A data center network comprising:
   at least three nodes comprising an optical switching arrangement;
   a first subnetwork configured to connect the nodes, comprising at least one of a switch and a router; wherein the nodes comprise a first data connection for connecting at least one server to the first subnetwork;
   an offload subnetwork comprising an optical link configured to provide an optical path arranged to link the optical switching arrangements of the nodes,
   wherein the node further comprises an optical transceiver for connecting to the at least one server and for transmitting and receiving on the optical link,
   wherein the switching arrangement is configurable between a first configuration in which the optical path bypasses the optical transceiver and a second configuration in which the optical path is optically connected to the optical transceiver, such that the offload subnetwork is configurable to provide a point-to-point link between two of the nodes whilst bypassing the optical transceiver of the at least one other node, wherein the switching arrangement comprises a first optical switch, a second optical switch and an optical bypass link,
   wherein the first optical switch is connected to a first external port and is reconfigurable between the first configuration in which the first external port is connected to a first end of the optical bypass link and the second configuration in which the first external port is connected to the transmitter; and
   wherein the second optical switch is connected to a second external port and is reconfigurable between the first configuration in which the second external port is connected to a second end of the optical bypass link and the second configuration in which the second external port is connected to the receiver.

5. The data center network as claimed in claim 4, wherein the offload subnetwork comprises an optical ring network.

6. The data center network as claimed in claim 4, further comprising an orchestrator configured to determine to use the offload subnetwork for a traffic flow between nodes, and if so, the orchestrator is configured to control the switching arrangements to configure the point-to-point link.

7. The data center network as claimed in claim 6 wherein the orchestrator is configured to determine to use the offload subnetwork for a traffic flow between nodes if the required capacity of the flow exceeds a predefined threshold.

8. A method of operating a node in a data center network, wherein the node comprises a first data connection for connecting at least one server to a first subnetwork comprising at least one of a switch or a router, the method comprising:
   receiving a control signal for a switching arrangement of the node, and
   configuring the switching arrangement to a first configuration in which an offload subnetwork bypasses an optical transceiver of the node or to a second configuration in which the optical transceiver is optically linked to the offload subnetwork, wherein the switching arrangement comprises a first optical switch, a second optical switch and an optical bypass link,
   wherein the first optical switch is connected to a first external port and is reconfigurable between the first configuration in which the first external port is connected to a first end of the optical bypass link and the second configuration in which the first external port is connected to the transmitter; and wherein the second optical switch is connected to a second external port and is reconfigurable between the first configuration in which the second external port is connected to a second end of the optical bypass link and the second configuration in which the second external port is connected to the receiver.

9. A method of operating a data center network, the network comprising a first subnetwork, an offload subnetwork and at least three nodes, wherein the first subnetwork is configured to connect the nodes and comprises at least one of a switch and a router; and the offload subnetwork comprises an optical path to link the nodes, the method comprising:

identifying a flow between a first node and a second node for offloading to the offload subnetwork;

establishing a point-to-point link between the first node and the second node by configuring switching arrangements of the first node and the second node to connect a transceiver of the node to the optical path, and configuring the switching arrangement of the at least one other node to bypass the optical path from the transceiver of the node, wherein configuring the switching arrangement comprises configuring a first optical switch and a second optical switch to connect to the transceiver to connect the transceiver of the node to the optical path or configuring the first optical switch and the second optical switch to connect to an optical bypass link to bypass the optical path from the transceiver of the node.

10. The method as claimed in claim 9, further comprising an orchestrator:

detecting or determining a flow for the offload subnetwork by comparing capacity requirements of the flow demands with a threshold; and constructing a schedule for transmission of such flows between network nodes in the offload subnetwork, and transmitting control signals to network nodes connected by the offload subnetwork to configure a switching arrangement at the network nodes to either connect or bypass the offload subnetwork.

11. An orchestrator for a data center network comprising: one or more processors; and a memory, wherein said memory comprising instructions executable by the one or more processors, wherein the one or more processors is configured to:

detect or determine a flow for communication over an optical offload subnetwork by comparing a characteristic of the flow with a threshold; and construct a schedule of logical links for transmission of flows between network nodes in the offload subnetwork, and to transmit control signals to network nodes connected by the offload subnetwork to configure a switching arrangement at the network nodes to either connect or bypass the offload subnetwork, wherein the switching arrangement is configured by configuring a first optical switch and a second optical switch to connect to a transceiver to connect the transceiver of the node to an optical path or configuring the first optical switch and the second optical switch to connect to an optical bypass link to bypass the optical path from the transceiver of the node.

12. The orchestrator as claimed in claim 11, wherein the one or more processors are further configured to:

analyze the flows for communication over the optical offload subnetwork; and determine, on the basis of the analyzing, for the flow to deny optical offload, insert the flow into a booking list or insert the flow into an overbooking list.

13. The orchestrator as claimed in claim 11, wherein the one or more processors is configured to periodically poll of network nodes.

14. The orchestrator as claimed in claim 11, wherein the one or more processors is configured to detect flows at a cross-point switch or to identify flows from planned data transfers.

15. A method of operating an orchestrator, comprising:

detecting or determining a flow for communication over an optical offload subnetwork by comparing a characteristic of the flow with the threshold; and constructing a schedule of logical links for transmission of flows between network nodes in the offload subnetwork, and transmitting control signals to network nodes connected by the offload subnetwork to configure a switching arrangement at the network nodes to either connect or bypass the offload subnetwork, wherein the switching arrangement is configured by configuring a first optical switch and a second optical switch to connect to a transceiver to connect the transceiver of the node to an optical path or configuring the first optical switch and the second optical switch to connect to an optical bypass link to bypass the optical path from the transceiver of the node.

16. A non-transitory computer readable storage medium, including computer executable instructions, said computer executable instructions are configured to execute a method according to claim 8.

* * * * *